United States Patent [19]

Balsom

[11] Patent Number: 5,568,455
[45] Date of Patent: Oct. 22, 1996

[54] SYSTEM AND METHOD FOR THE STORAGE AND RETRIEVAL OF OFF-LINE PERFORMATTED OPTICAL MEDIA

[75] Inventor: James Balsom, Poway, Calif.

[73] Assignees: Sony Corporation, Tokyo, Japan; Sony Electronics, Park Ridge, N.J.

[21] Appl. No.: 444,323

[22] Filed: May 18, 1995

[51] Int. Cl.$^6$ .................................................. G11B 17/22
[52] U.S. Cl. ............................ 369/30; 395/404; 395/438
[58] Field of Search .................................. 369/30, 34, 36, 369/37, 38, 41, 178, 184, 180; 395/404, 438, 439, 412; 364/925.31, 959.3, 961.4

[56] References Cited

U.S. PATENT DOCUMENTS

| | | | |
|---|---|---|---|
| 4,766,581 | 8/1988 | Korn et al. | 369/30 |
| 4,775,969 | 10/1988 | Osterlund | 369/32 |
| 5,450,385 | 9/1995 | Ellis et al. | 369/34 |
| 5,455,926 | 10/1995 | Keele et al. | 395/404 |
| 5,467,326 | 11/1995 | Miyashita et al. | 369/30 |
| 5,469,560 | 11/1995 | Beglin | 395/439 |

*Primary Examiner*—Tan Dinh
*Attorney, Agent, or Firm*—Lise A. Rode, Esq.; Jerry A. Miller

[57] ABSTRACT

A system and method for the storage and retrieval of off-line optical disk cartridges for use with an optical disk cartridge storage and retrieval device which stores a number of optical disk cartridges near-line. Each of the off-line and near-line optical disk cartridges is assigned a unique alphanumeric code, and a label including this unique alphanumeric code and an optical code representing same is externally affixed on the optical disk cartridge. Each of the optical disks encased by the optical disk cartridges is then preformatted so that the unique alphanumeric code of the optical disk cartridge encasing the optical disk becomes the unique preformatted disk ID of the optical disk. A list of the preformatted disk ID's is then stored in data storage in the optical disk cartridge storage and retrieval device. A request to access a selected optical disk cartridge is made by a computer connected to the optical disk cartridges storage and retrieval device by a media ID associated with at least the selected optical disk cartridge. If it is determined that the selected optical disk cartridge is not located in the optical disk cartridge storage and retrieval device, the computer displays a prompt to load the selected optical disk cartridge according to the unique preformatted disk ID.

21 Claims, 6 Drawing Sheets

SYSTEM AND METHOD FOR THE STORAGE AND RETRIEVAL OF OFF-LINE PERFORMATTED OPTICAL MEDIA

BACKGROUND OF THE INVENTION

1. Field of Invention

This invention relates to the field of media management. More particularly, this invention relates to a system and method for the storage and retrieval of off-line preformatted optical disk cartridges.

2. General Background

Figure 1:
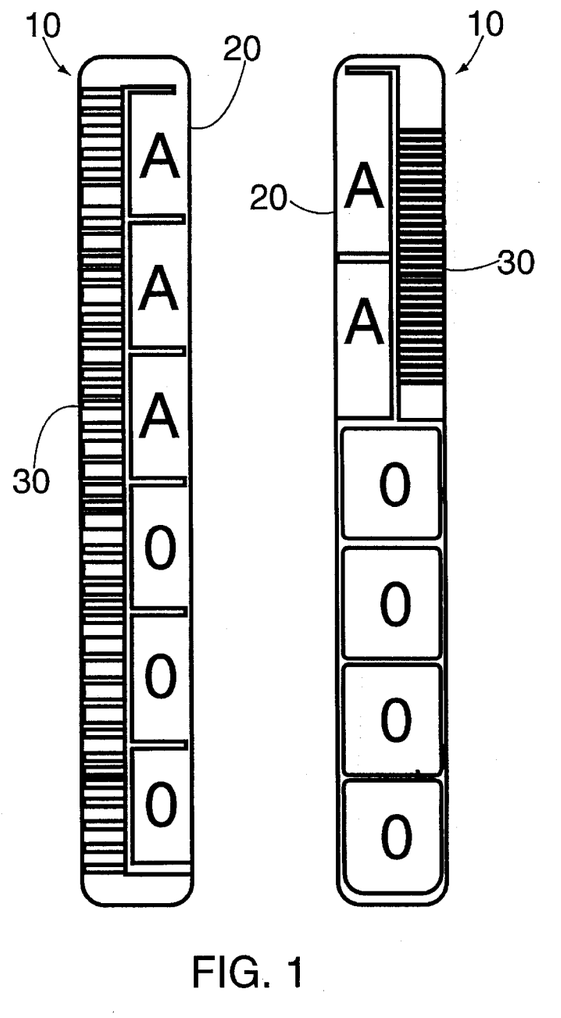
FIG. 1 shows conventional alphanumeric coded labels for use in the management of off-line media.

Management of off-line media has been proposed in the area of magnetic media such as 4 MM or 8 MM cassettes. One such proposal involves the affixation of sequentially-numbered coded labels to the outside of the cassette cartridges. As seen in FIG. 1, the label 10 generally includes two parts: a first part including an alphanumeric code 20 unique to the particular cassette, and a second part including a bar code 30 adjacent to the alphanumeric code 20. Under this proposal, each time a new cassette is ordered or consumed, the alphanumeric code 20 is incremented and a label including this incremented code is affixed to the new cassette. The bar code 30 adjacent to the alphanumeric code 20 may be scanned with a bar code scanner (not shown), to generate an electrical signal representing the alphanumeric code 20. This signal is generally provided to a decoding device, and the decoded signal is stored in data storage e.g., as part of an inventory, list. In this manner, the user can keep track of the cassettes used or consumed. Furthermore, the cassette cartridges can be stored in a storage area according to their respective sequentially-numbered codes. The labels can be color-coded so that a particular cassette cartridge can be readily identified by simple visual inspection.

More recently, as the requirements for access to larger amounts of data and other information increases, there is a concomitant demand for more flexible, expandable mass storage. Magneto-optical and oliver erasable optical disks have become increasingly popular for storing data, given that substantial amount of information may be stored in digital format in these high density disks, information may be readily written to and erased or read from these disks, and such disks are generally impervious to stray magnetic fields at room temperatures. In light of the aforementioned advantages, erasable optical disks have become particularly popular with users who require substantial libraries of cataloged information. For example, sales and marketing departments may use such disks in order to store catalogs of financial data, graphics, and other information.

In addition, optical disk cartridge storage and retrieval devices have been proposed which allow for the storage and retrieval of any of a preselected number of erasable optical disk cartridges. One such optical disk cartridge storage and retrieval device is the OSL-2000, which is commercially available from Sony Electronics Inc., 1 Sony Drive, Park Ridge, N.J. 07656, and which may be seen with reference to FIGS. 3a and 3b. Optical disk cartridge storage and retrieval devices may be dedicated to a computer or may be connected to several workstations via a computer network such as a local area network (LAN) or wide are network (WAN) . The following description relates to a network-enabled optical disk cartridge storage and retrieval device; however, it will be understood that the following description is substantially applicable to that of an optical disk cartridge storage and retrieval device dedicated to a single computer.

Figure 3A:
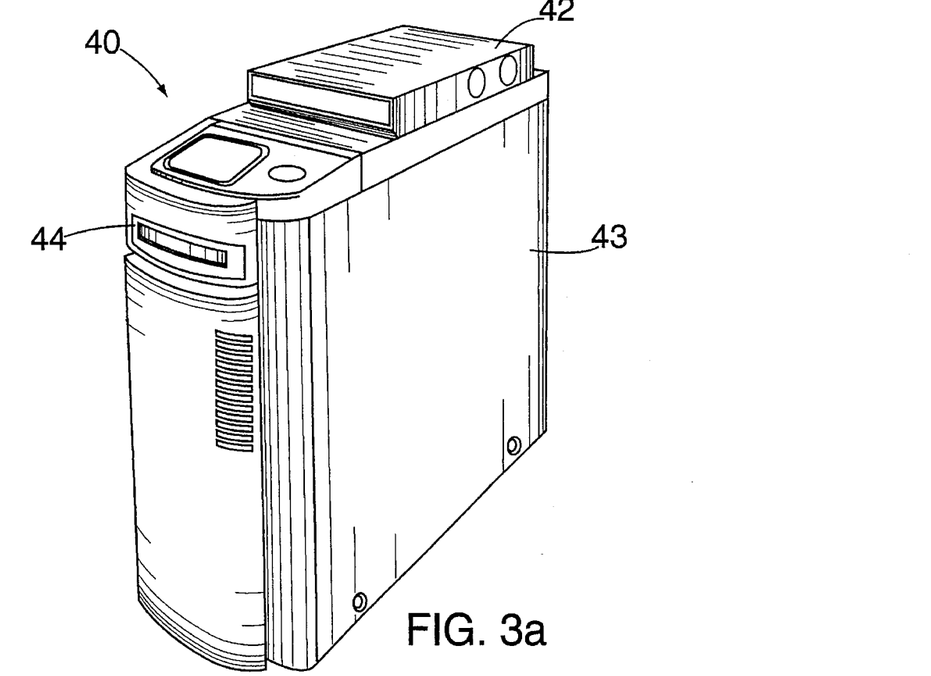
FIG. 3a shows an external view of an optical disk cartridge storage and retrieval device.
Figure 3B:
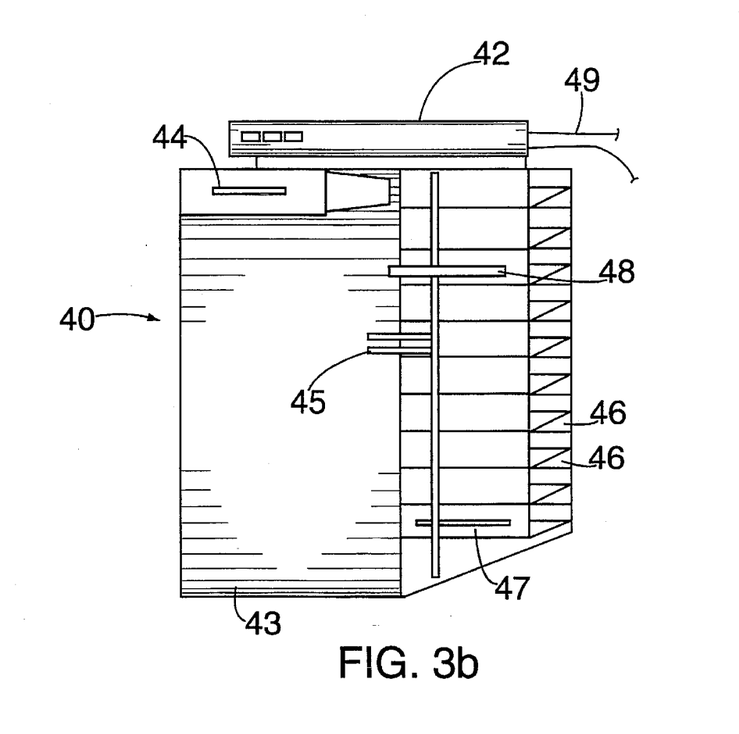
FIG. 3b shows a schematic of the optical disk cartridge storage and retrieval device of FIG. 3a FIG. 4 shows a flowchart of the preferred method of preformatting the optical disks encased by the optical disk cartridges.

Referring to FIGS. 3a and 3b, it will be seen that the network-enabled optical storage and retrieval device 40 preferably includes two components: a control system or controller 42 and the optical storage and retrieval device 43 itself. The controller 42 preferably includes a CPU, memory (preferably EPROM and RAM), a disk controller (e.g., an SCSI disk controller), and a network interface (not shown). In addition, the controller 42 contains a hard disk drive (not shown) for holding software, including executable programs and an operating system, and for serving as a cache for reading and writing accesses to increase information transfer to and from the optical disks encased by the optical disk cartridges. The hard disk drive also can maintain directory, pointers to all optical disk cartridges, including those stored off-line. The network-enabled optical disk cartridge storage and retrieval device 40 is connected at 49 to a LAN or WAN and acts as a server to provide storage resources to remote workstations connected to the network, and to allow these workstations to access information stored on the erasable optical disks contained in the optical storage and retrieval device 43.

The optical storage and retrieval device 43 stores up to, for example, twenty optical disk cartridges (not shown) in one or more racks in an array of horizontally-oriented storage slots 46. These storage slots are arranged in one or more vertical columns so that the optical disk cartridges sit horizontally one on top of another in the individual slots 46. A cartridge retrieval arm or mechanism 45 which is movable to a position adjacent one of such slots 46, is then activated to retrieve a selected disk 48 for reading/writing/erasing upon command from, and under the control of, either a central microprocessor located within the device or under the control of an external controller connected thereto. Read/write operations occur via a laser light beam imparted on the optical disk through an aperture in the optical disk cartridge. Cartridges stored in the device and retrievable by the cartridge retrieval arm or mechanism 45, are deemed "near-line", since they may be readily placed "on-line" via the cartridge retrieval arm or mechanism 45. The optical disk cartridges may be exchanged by ejection of a particular cartridge and insertion of another cartridge through a "mail" slot 44 in the device. These optical disk cartridge storage and retrieval devices are commonly referred to as "jukeboxes", given their similarity to the mechanical devices used for playing audio recordings popularized in the 1930's.

In operation, a workstation (not shown) connected to the network will send a request to access information from one of the optical disk cartridges which may be stored either near-line in the network-enabled optical storage and retrieval device 40, or off-line in storage. The request to access data is generally made by a "volume" or "media" ID. This media ID constitutes a name assigned to any number of optical disk cartridges associated by the type of information stored on the optical disks encased by the cartridges. For example, if one were using the network-enabled optical storage and retrieval device in the sales and marketing area, one media ID might be associated with three disk cartridges including competitors sales information, while a separate media ID might be associated with five disk cartridges including invoices, expense reports, and general accounting information. Because the network-enabled optical storage and retrieval device 40 maintains a list of the status of disk cartridges including those which are off-line, and a media ID can be associated with a limitless number of these optical disk cartridges, new disk cartridges can be readily added to an already existing group of optical disk cartridges associated with a particular media ID. The effect is to give the workstation user unlimited storage capacity for the particular data or other information which he is managing.

After receiving the request to access the desired information, the CPU of the controller 42 preferably communicates with the network-enabled optical storage and retrieval device cartridge retrieval arm 45 through an SCSI interface, and the server software sends instructions to the cartridge retrieval arm 45 to move the optical disk cartridges between the storage slots 46 and the optical disk drive 47 for read and write operations. An application in the optical storage and retrieval device server maintains a list of the status of the disk cartridges located in the optical storage and retrieval device, and, as indicated above, can also maintain directory pointers to off-line optical disk cartridges. Once the selected optical disk cartridge(s) 48 are moved to the optical disk drive 47, a workstation can access any information stored therein.

Although, as stated previously, network-enabled optical storage and retrieval devices 40 may hold, for example, as many as twenty optical disk cartridges, often times workstation users will desire access to a disk which is not loaded in the optical storage and retrieval device. If the workstation attempts to access information from a disk which is not currently loaded in the network-enabled optical storage and retrieval device 40, the workstation user will be required to manually retrieve the desired disk cartridge from the warehouse or other off-line storage area and substitute the desired disk for a disk which is currently loaded in the optical storage and retrieval device.

As stated previously, users of erasable optical media generally require substantial libraries of erasable optical disk cartridges, and thus generally organize and store these disk cartridges off-line in warehouses or other storage areas for retrieval at some later desired time using a labeling method, such as discussed above. However, due to such substantial number of disk cartridges, it becomes a tedious and laborious process of locating a desired off-line disk cartridge within the storage area. Additionally, when a disk is removed, it is often cumbersome to replace it in its proper location, particularly if other disks have also been removed, thereby creating a number of available/potential storage slots for the disk. This tedious and cumbersome process is exacerbated in the case of the network-enabled optical disk storage and retrieval device, given the fact that as more workstations, and thus users, have access to the network-enabled optical storage and retrieval device, more optical disk cartridges are likely to be exchanged, thus requiring users to make more trips to the optical disk cartridge storage area. Furthermore, as workstations are often remote from the optical disk cartridge storage area, the problem of readily located the desired optical disk cartridge becomes even more laborious and cumbersome. Similarly, the problem of replacing the optical disk cartridge in its proper location after it is has been used increases as the number of optical disk cartridge exchanges increases. External labeling, such as suggested above for magnetic cassettes, is insufficient as generally the workstation user is remote from the optical storage and retrieval device server, and will generally not know the alphanumeric code previously assigned to the optical disk cartridge(s) which he desires. Thus the user will have to determine from some sort of listing, the particular alphanumeric code for the optical disk cartridge(s) he desires before traveling to the storage area to retrieve same. As the number of optical disk cartridges increases, and the workstations become more remote, a substantial amount of time and energy will be unnecessarily expended.

It would therefore be desirable to provide a system for efficient off-line management of the optical disk cartridges so that a user could readily locate a desired disk from a storage library and replace said disk upon completion of use of same.

Accordingly, it is one object of the invention to provide a system and method of off-line management of optical media.

It is another object of the invention to provide a system and method of storing and retrieving optical disk cartridges from a storage area.

It is yet another object of the invention to provide a system and method of storing and retrieving optical disk cartridges which allows a user of an optical storage and retrieval device to readily locate a desired disk cartridges from a storage area and replace said disk upon completion of use of same.

SUMMARY OF THE INVENTION

Therefore, in accordance with one object of the invention, there is provided a system and method for the storage and retrieval of off-line optical disk cartridges for use with an optical disk cartridge storage and retrieval device. A list of preformatted disk ID's is stored in data storage in the optical disk cartridge storage and retrieval device which stores a number of optical disk cartridges near-line. Each of the preformatted disk ID's is unique to one of a plurality of optical disk cartridges which are either located in the optical disk cartridge storage and retrieval device or are located off-line. A request to access a selected optical disk cartridge is made by a computer connected to the optical disk cartridges storage and retrieval device by a media ID associated with at least the selected optical disk cartridge, wherein the media ID also corresponds to at least one of the unique preformatted disk ID's. The data storage in the optical disk cartridge storage and retrieval device is then addressed according to this media ID and a controller determines whether the selected optical disk cartridge is located in the optical disk cartridge storage and retrieval device. If it is determined that the selected optical disk cartridge is not located in the optical disk cartridge storage and retrieval device, the computer displays a prompt to load the selected optical disk cartridge according to the unique preformatted disk ID.

In accordance with another object of the present invention, each of the off-line and near-line optical disk cartridges is assigned a unique alphanumeric code, and a label including this unique alphanumeric code and an optical code representing same is externally affixed on the optical disk cartridge. Each of the optical disks encased by the optical disk cartridges is then preformatted so that the unique alphanumeric code of the optical disk cartridge encasing the optical disk becomes the unique preformatted disk ID of the optical disk. Therefore because a prompt which includes the unique preformatted disk ID is displayed on the computer display, and this ID corresponds to the alphanumeric code of the label affixed to the optical disk cartridge, a user can readily locate a desired off-line disk from a storage library and replace same through a quick visual inspection of the general storage library.

In accordance with yet another aspect of the invention, the optical disk cartridge storage and retrieval device of the present invention stores a maximum number of optical disk cartridges internally. The controller determines whether the optical disk cartridge storage and retrieval device is storing the maximum number of optical disk cartridges. If the maximum number is being stored, and a request to access an optical disk cartridge which is not currently stored in the optical disk cartridge storage and retrieval device is received, the controller uses a well-known algorithm to eject that optical disk cartridge which is least-recently accessed by the computer.

In accordance with still yet another aspect of the present invention, if a request to access an optical disk cartridge includes a write command, and if the controller determines that there is insufficient storage space on the optical disk to write the information thereto, the optical disk storage and retrieval device data storage is addressed to find from the list of all preformatted disk ID's, the next available preformatted disk ID which is not associated with a media ID.

DETAILED DESCRIPTION OF THE PREFERRED EMBODIMENT

An embodiment of the system and method for storing and retrieving erasable optical disks according to the present invention will now be described in detail with reference to the accompanying drawings.

In accordance with a first object of the invention, each optical disk cartridge is assigned a unique alphanumeric ID code. A label including this unique ID is externally affixed to the optical disk cartridge (not shown) for easy reference by a user who is attempting to find or replace the cartridge in a storage area. Examples of the external label of one embodiment of the system of the present invention may be seen with reference to FIG. 2. A first part of the label 10 includes an alphanumeric code 20 unique to a particular optical disk cartridge. In this embodiment, the alphanumeric code 20 includes 7 digits; the first three including alphabetic characters 22, and the latter four including numeric characters 24. Of course, it will be understood that the code is not limited as such and that similar such coding can be used.

Figure 2:
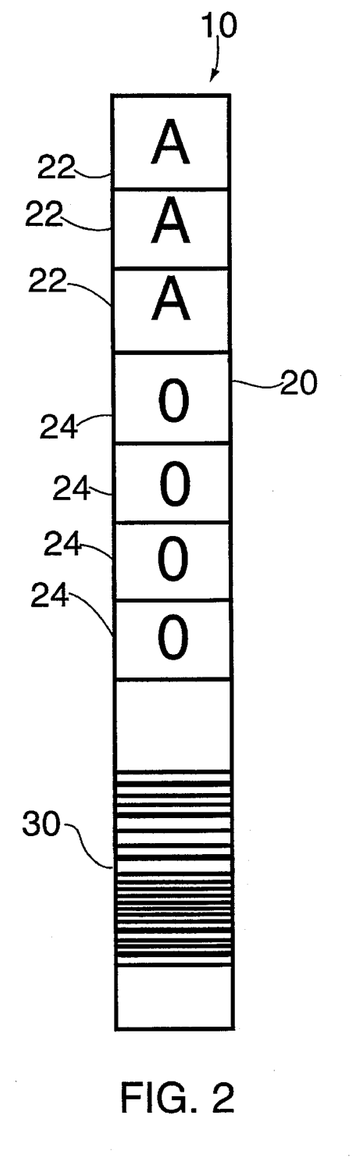
FIG. 2 shows a preferred embodiment of the optical disk cartridge label including the alphanumeric ID code of the present invention.

The codes are assigned sequentially so that each successive disk cartridge in a series preferably differs from the preceding disk by only one character. For example, in a series of ten disk cartridges the optical disk cartridges might be labeled as follows:

|        |         |
|--------|---------|
| Disk 1  | AAA0000 |
| Disk 2  | AAA0001 |
| Disk 3  | AAA0002 |
| Disk 4  | AAA0003 |
| .      | .       |
| .      | .       |
| .      | .       |
| Disk 10 | AAA0009 |

In addition, the alphanumeric code is preferably color-coded in order to further assist in the retrieval of the optical disk cartridge through simple visual inspection. In one embodiment, each of the four numeric characters 22 is assigned a different color, although it will be understood that various alternate color-coding schemes may be used. For example, in the previous series, if each of the numeric characters is assigned a different color, it will be appreciated that the color pattern of a succeeding alphanumeric code differs from the preceding code only by the color of the last numeric character. This allows a person who is attempting to retrieve or store a particular disk or disks off-line, to ascertain through a quick visual inspection of the storage area, where the general location of the desired disk cartridge is.

A second part of the label 10 includes an optical code 30 which is readable by a optical scanning device (not shown), to read out electrical signals representing said unique alphanumeric code 20. Preferably, this part of the label 10 includes a well-known bar-code which is readable with a bar-code scanner as known in the art.

Figure 4:
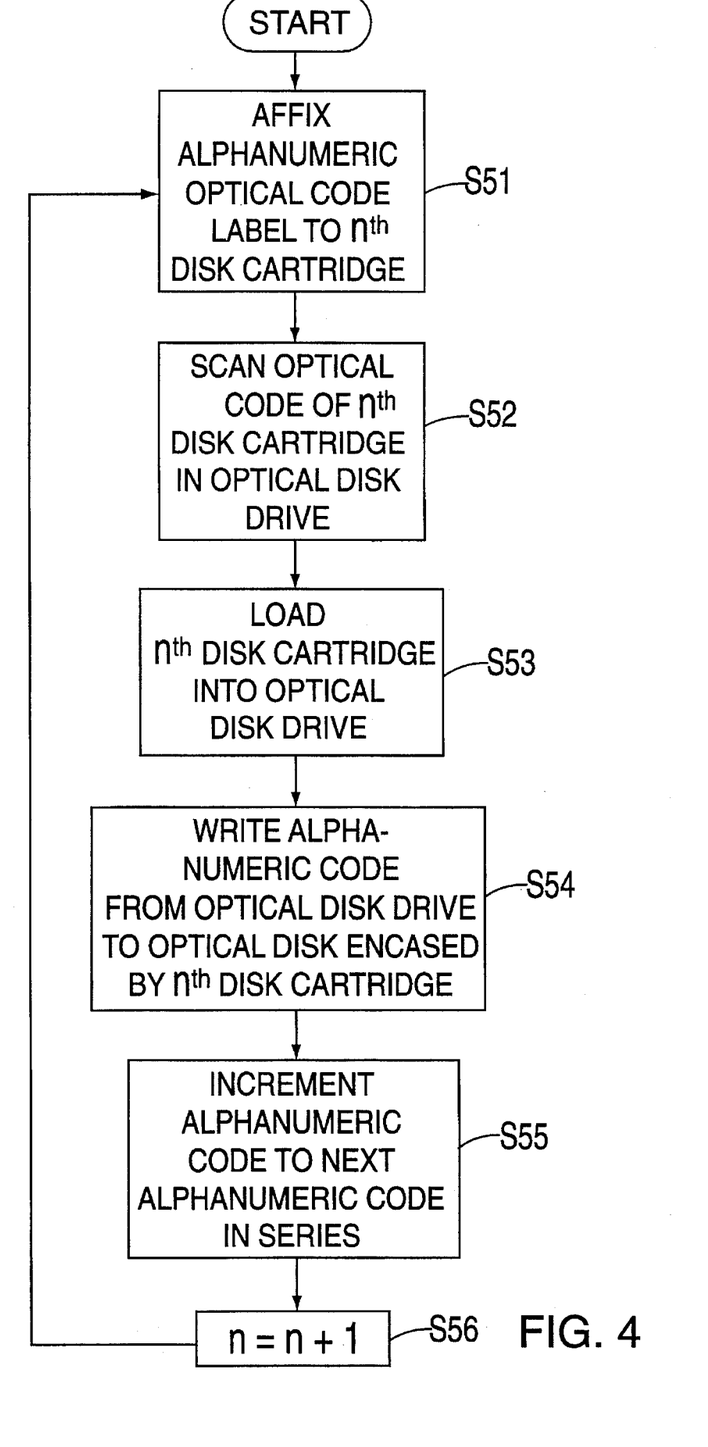

Next, each of the disks encased by the optical disk cartridge is prelabeled; i.e., preformatted. With reference to FIG. 4, as seen in step S51, after a first alphanumeric code 20 is assigned to an optical disk cartridge, and a label 10 including this alphanumeric code 20 and the optical code 30 adjacent thereto is externally affixed to the cartridge, the optical code 30 is scanned by an optical scanning device to read out electric signals representing said alphanumeric code 20 (S52). The optical scanning device is connected to a data storage device (not shown), such as hard disk drive, so that the electric signals are scanned into said data storage. The data storage may include the optical storage and retrieval device hard disk drive, or it may include separate data storage. This optical disk cartridge is then loaded into the optical disk drive in step S53, after which the alphanumeric code 20 which has been read into the data storage as electric signals from the optical code 30, is written to the disk encased by the disk cartridge as the preformatted disk ID (S54). The alphanumeric code 20 is then incremented (S55) and the next optical disk cartridge is obtained (S56). This process is repeated until each of the optical disk cartridges is labeled, and the disks encased therein are preformatted. Using this method, the alphanumeric code 20 unique to a particular optical disk cartridge becomes the disk ID of the optical disk encased by the optical disk cartridge.

An embodiment of the method of storing and retrieving off-line optical disks will now be described with reference to FIGS. 5a and 5b. Description of the system and method of storing and retrieving off-line optical disks will be made with reference to the network-enabled optical disk cartridge storage and retrieval device; however, it will be appreciated that this system and method is not so limited and may also be used with an optical disk cartridge storage and retrieval device which is dedicated to a computer.

Figure 5A:
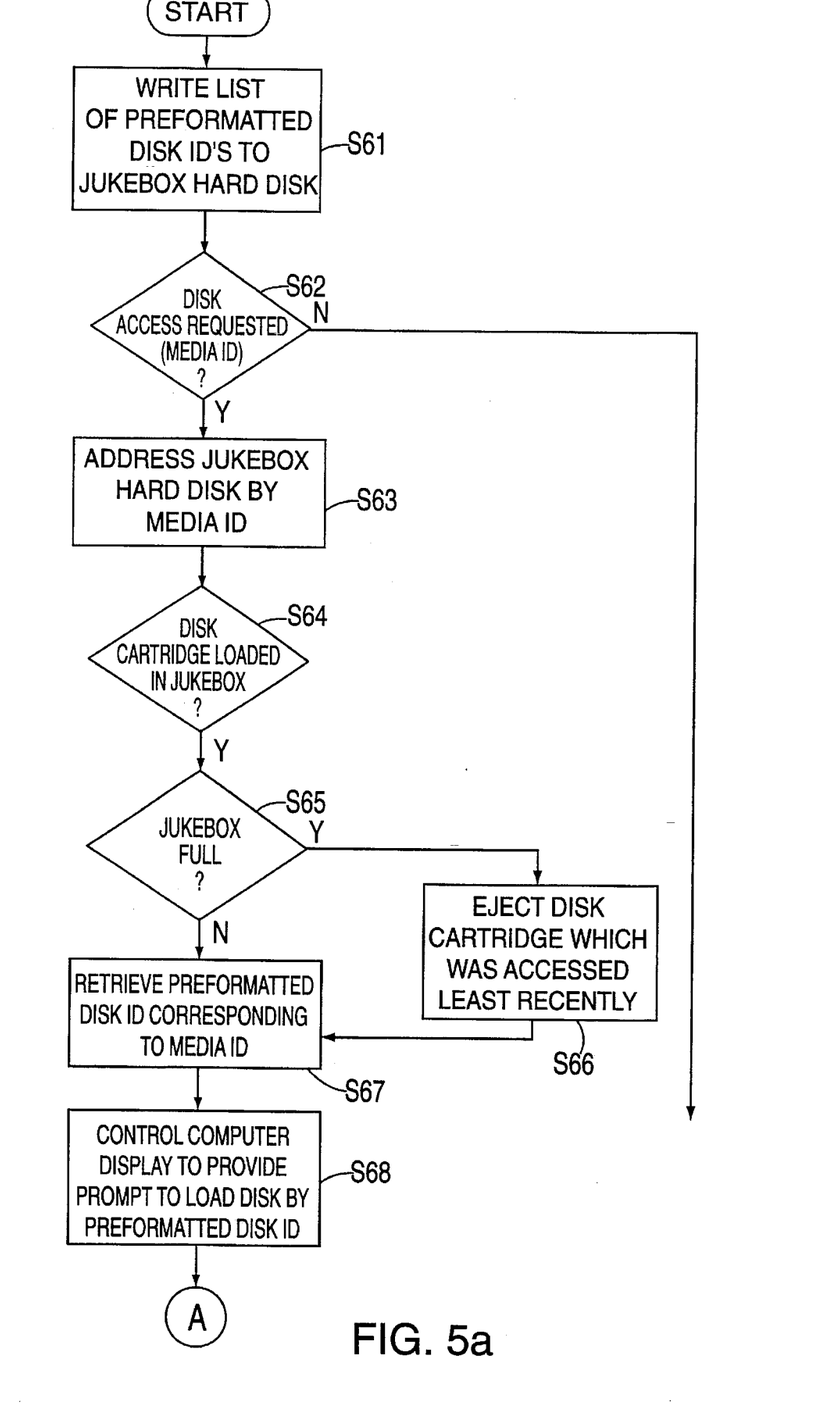
FIG. 5a and 5b show a flowchart of the preferred method of storing and retrieving off-line optical disk cartridges.
Figure 5B:
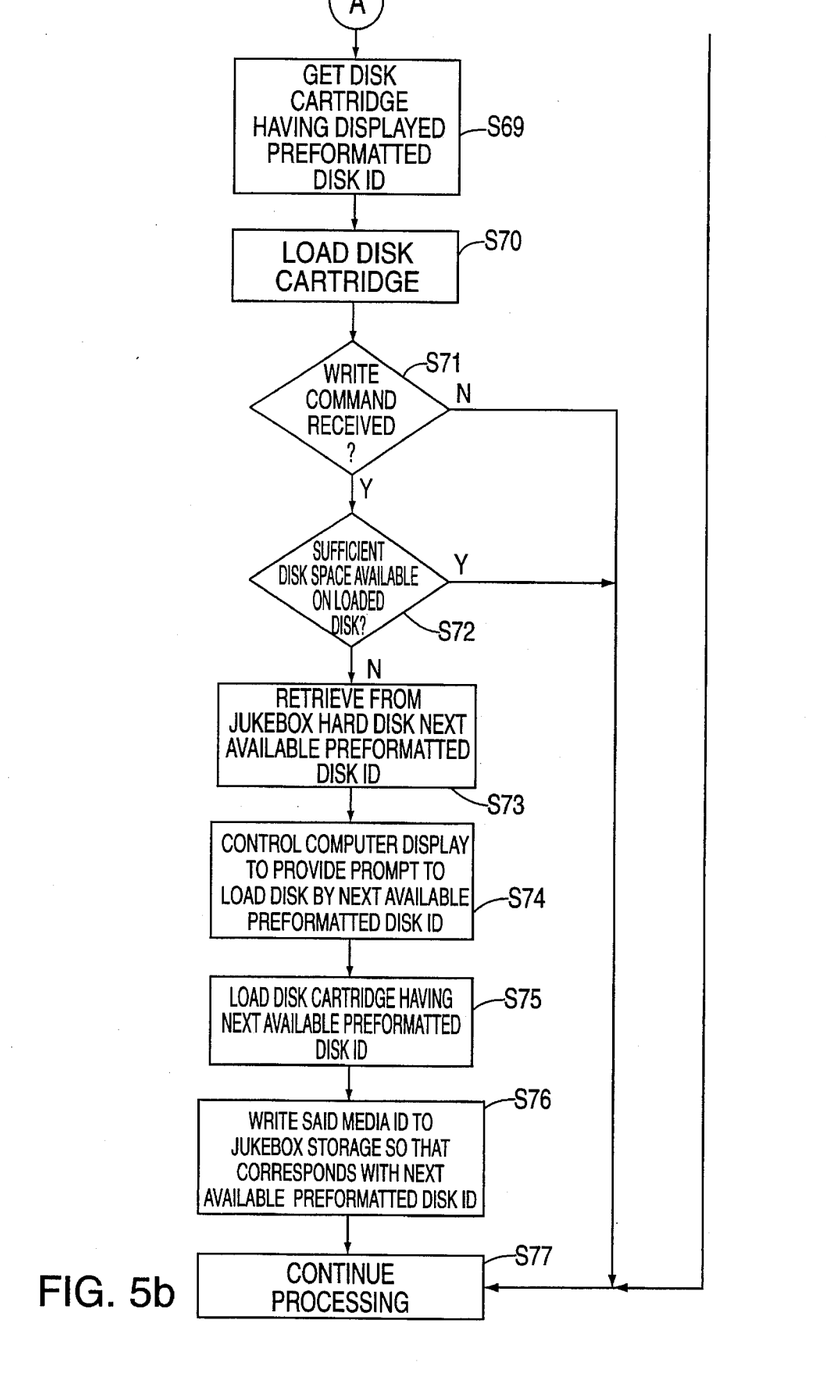

As seen in FIG. 5a, at step S61, a list including each of the unique pre-labeled or preformatted disk ID's is stored in data storage, preferably the hard disk drive, of the network-enabled optical storage and retrieval device. A user on a workstation (not shown) connected via a computer network (not shown) to the network-enabled optical storage and retrieval device 40 sends a request to access desired information by its volume, or media, ID (S62). As discussed above, the network-enabled optical storage and retrieval device 40 allows for the association of one or more optical disk cartridges with a media ID. The optical storage and retrieval device network-enabled 40 then addresses the data storage at step S63 to determine whether the optical disk cartridge or cartridges associated with that media ID and on which that information is stored are located near-line in the optical storage and retrieval device. If one of the optical disk cartridges associated with the media ID is not located within the optical storage and retrieval device (S64), then the CPU of controller 42 retrieves from the data storage the preformatted disk ID corresponding to the media ID (S67) and then sends a message to the workstation to provide a prompt on the computer display to load the optical disk cartridge(s)

which is (are) not currently located near-line in the optical storage and retrieval device (S68).

Figure 6:
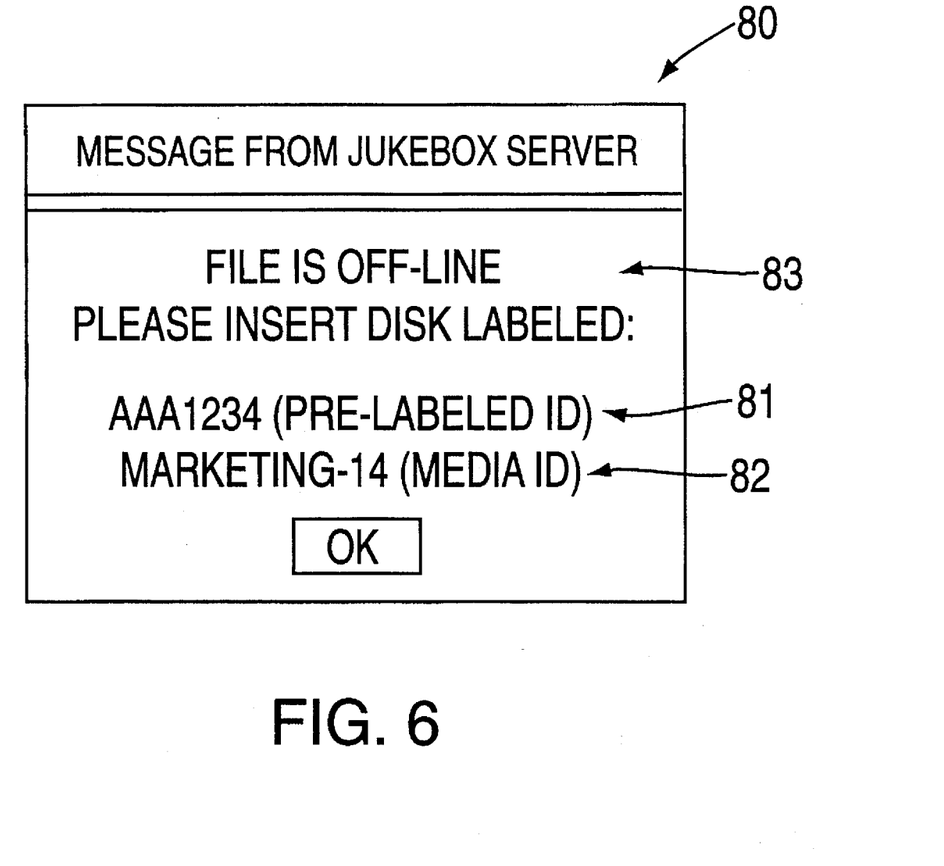
FIG. 6 shows a computer prompt to load an off-line optical disk into the optical disk cartridge storage and retrieval device according to the present invention.

As seen in FIG. 6 the prompt 80 on the computer display preferably includes the unique preformatted disk ID 81 which is associated with the optical disk cartridge which are not located within the optical storage and retrieval device 43. Additionally, in one embodiment, the prompt also includes the media ID 81 associated with the optical disk cartridge and a message, such as "FILE IS OFF LINE. PLEASE LOAD DISK LABELED:" The unique preformatted disk ID 81 may also be displayed in various other ways to further assist the user in a quick determination of the general storage location of the desired optical disk cartridge. For example, it might be displayed on the computer display in the same colors as the color of the alphanumeric code 20 assigned to that particular optical disk cartridge, and/or, in fact,it might be displayed vertically on the display as it would appear on the optical disk cartridge itself. Of course, other variations will be appreciated by those skilled in the art.

For example, as shown in FIG. 6, a hypothetical workstation user may attempt to access from a workstation information available under a media ID 82 which is known to the user as "MARKETING-14". The controller 42 then addresses the data storage of the network-enabled optical storage and retrieval device 40 to determine whether in fact the optical disk cartridges associated with the media ID "MARKETING-14" are currently stored in the optical storage and retrieval device 43. As seen in the example of FIG. 6, if the disk cartridge having the preformatted disk ID, and thus alphanumeric code 20, "AAA1234", is not stored in the optical storage and retrieval device 43, and thus the workstation provides a prompt 80 to load this disk cartridge. As also shown in FIG. 6, the prompt 80 may also include the media ID 82; in this instance, "MARKETING-14". Again, the preformatted ID "AAA1234" may be displayed on the workstation display in the same colors as the alphanumeric code affixed to the optical disk cartridge encasing the disk which is associated with the preformatted disk ID "AAA1234", thus further assisting the user in the ready location of the desired optical disk cartridge.

As discussed above, the network-enabled optical storage and retrieval device stores a preselected number of optical disk cartridges. In accordance with another object of the present invention, and as seen in FIG. 5a, if the controller determines at step S65 that any of the optical disk cartridges associated with the media ID 82 is not stored in the optical storage and retrieval device 43 and also that the optical storage and retrieval device 43 is full, it will execute a well known "least-recently used" algorithm to determine which of the optical disk cartridges currently stored in the optical storage and retrieval device 43 were least-recently accessed by any of the workstations, and will cause the optical storage and retrieval device 43 to eject those optical disk cartridges from the optical storage and retrieval device 43 (S66). Preferably, the number of optical disk cartridges ejected from the optical storage and retrieval device corresponds to the number of optical disk cartridges which are to be loaded. It will be appreciated that other algorithms may be used in the ejection of the optical disk cartridges where the optical disk cartridge storage and retrieval device is full; for example, a first in-first out (FIFO) or last in-last out (LIFO) -type algorithm may be used.

Once the desired optical disk cartridges have been loaded (S69, S70), the workstation user can read or write information to the disks encased by same. However, at some point the disk storage space in a particular disk may be exceeded. In accordance with another aspect of the present invention, and again with reference to FIGS. 5a and 5b once the optical disk cartridges have been loaded, the controller determines whether a write command to write information to any of the disks has been received (S71). If the control system determines that in fact a write command has been received, the control system then determines whether sufficient space exists on the disks encased by the loaded optical disk cartridges (S72). If there is not sufficient space to write the information to the disk, the control system then addresses the data storage for the next available preformatted disk ID for which no media ID is associated (S73). This next available preformatted disk ID generally includes a new optical disk cartridge which has been labeled and preformatted according to the above-described method, but to which no information has been previously written. After determining the next available preformatted disk ID for which no media ID is associated, the controller controls the computer display to provide a prompt to load the optical disk cartridge having the alphanumeric coded label associated with the displayed preformatted disk ID (S74). Once this optical disk cartridge is loaded (S75), the controller then instructs this next available preformatted disk ID to be written to the data storage so that it is associated with that media ID for which the write request was received (S76). Thus, in the above example, if a write request was made under the media ID 82, "MARKETING-14", and due to insufficient disk space, the optical disk cartridge having the next available disk ID were required to be loaded, the controller would instruct the data storage to write the next available disk ID so that it is associated with the "MARKETING-14" media ID.

Thus it will be appreciated that the above described system and method of storing and retrieving off-line erasable optical disks allows a user of an optical storage and retrieval device to readily locate a desired disk cartridge from a storage area and replace said disk upon completion of use of same.

It is further apparent that in accordance with the present invention, an embodiment that fully satisfies the objectives, aims and advantages is set forth above. While the invention has been described in conjunction with specific embodiments, it is evident that many alternatives, modifications, permutations and variations will become apparent to those skilled in the art in light of the foregoing description. For example, the optical disk cartridge storage and retrieval device might be dedicated to a single computer. Additionally, a first in-first out (FIFO) or last in-last out (LIFO) algorithm may be used to determine which optical disk cartridge to eject in the case where the optical disk cartridge storage and retrieval device is full. Furthermore, the unique preformatted disk ID might be displayed on the computer display in the same colors as the color of the alphanumeric code assigned to that particular optical disk cartridge, and/or, in fact, it might be displayed vertically on the display as it would appear on the optical disk cartridge itself. Other embodiments will occur to those skilled in the art. Accordingly, it is intended that the present invention embrace all such alternatives, modifications and variations as fall within the scope of the appended claims.

What is claimed is:

1. A method for the storage and retrieval of off-line optical disk media, comprising the steps of:

storing into first data storage means in an optical disk cartridge storage and retrieval device, a list of preformatted disk ID's, wherein each of said preformatted disk ID's is unique to one of a plurality of optical disk cartridges, and wherein said optical disk cartridges are located in said optical disk cartridge storage and retrieval device or off-line;

sending an inquiry, from a computer connected to said optical disk cartridge storage and retrieval device, said inquiry comprising a request to access a selected one of a said plurality of optical disk cartridges, wherein said request to access said selected optical disk cartridge is by a media ID associated with said selected optical disk cartridge;

addressing said first data storage means through said computer according to said media ID, wherein said media ID corresponds to at least one of said unique preformatted disk ID's;

determining through controller means whether said selected optical disk cartridge is located in said optical disk cartridge storage and retrieval device; and, controlling said computer display through said controller means to provide a prompt to load said selected optical disk cartridge into said optical disk cartridge storage and retrieval device when said selected optical disk cartridge is not stored in said optical disk cartridge storage and retrieval device, said prompt including said unique preformatted disk ID corresponding to said selected optical disk encased by said optical disk cartridge.

2. The storage and retrieval method according to claim 1, wherein each of said optical disk cartridge encases an optical disk, and further comprising the steps of:

affixing a label on each of said plurality of optical disk cartridges, said label having a first index and a second index adjacent thereto, wherein said first index comprises an alphanumeric code selected from a sequential series of alphanumeric codes, said alphanumeric code being uniquely associated with one of said optical disk cartridges, and wherein said second index comprises an optical code capable of being read with an optical code scanning device to generate electrical signals representing said alphanumeric code; and, preformatting each of said optical disks so that said unique preformatted disk ID of said optical disk comprises said unique alphanumeric code of said optical disk cartridge encasing said optical disk.

3. The storage and retrieval method according to claim 2, wherein said preformatting step comprises the steps of:

scanning said second index of said label of a first of said plurality of said optical disk cartridges with optical scanning means connected to second data storage means, in order to generate to said second data storage means, said electrical signals representing said unique alphanumeric code;

loading said first optical disk cartridge into said second data storage means; and, writing said unique alphanumeric code from said second data storage means to said optical disk encased by said first optical disk cartridge, whereby said unique alphanumeric code of said first optical disk cartridge becomes said first optical disk cartridge's unique preformatted disk ID.

4. The storage and retrieval method according to claim 3, wherein said sequential series of alphanumeric codes includes a next unique alphanumeric code and said plurality of optical disk cartridges includes a next optical disk cartridge, said next optical disk cartridge encasing a next optical disk, and further comprising the steps of:

incrementing said unique alphanumeric code to said next unique alphanumeric code in said sequential series of alphanumeric codes; and, preformatting said next optical disk encased by said next optical disk cartridge, so that said unique preformatted disk ID of said next optical disk comprises said next unique alphanumeric code.

5. The storage and retrieval method of claim 2, wherein said optical disks are selected from the group comprising: magnetic, optical or magneto-optical disks.

6. The storage and retrieval method according to claim 2, wherein each of said unique alphanumeric codes in said sequential series of alphanumeric codes comprises a preselected number of characters.

7. The storage and retrieval method according to claim 6, wherein said preselected number is seven.

8. The storage and retrieval method according to claim 6, wherein each of said characters of said unique alphanumeric code is color-coded.

9. The storage and retrieval method according to claim 8, wherein said unique preformatted disk ID prompt is displayed on said computer display in color, so that said display color matches said color-code of said unique alphanumeric code.

10. The storage and retrieval method of claim 2, wherein said computer comprises at least one workstation, wherein said at least one workstation is connected to said optical disk storage and retrieval device via a computer network.

11. The storage and retrieval method of claim 1, wherein said first data storage means comprises a hard disk drive.

12. The storage and retrieval method of claim 1, wherein said prompt further includes said media ID of said selected optical disk cartridge.

13. The storage and retrieval method of claim 1, wherein said optical disk cartridge storage and retrieval device stores a predetermined number of optical disk cartridges, and further comprising the steps of:

determining through said controller means whether said optical disk cartridge storage and retrieval device is storing said predetermined number of optical disk cartridges; and, ejecting an optical disk cartridge from said optical disk cartridge storage and retrieval device when said controller means determines that said selected disk cartridge is not stored in said optical disk cartridge storage and retrieval device and that said optical disk cartridge storage and retrieval device is storing said predetermined number of optical disk cartridges, said ejected optical disk cartridge comprising that optical disk cartridge which is least-recently accessed by said computer.

14. The storage and retrieval method of claim 2, wherein said predetermined number of optical disk cartridges is twenty.

15. The storage and retrieval method of claim 2, wherein each of said plurality of optical disks has a predetermined amount of storage and wherein said list of unique preformatted disk IDs includes a next available unique preformatted disk ID for which no media ID is associated, and further comprising the steps of:

loading said selected optical disk cartridge into said optical disk cartridge storage and retrieval device, determining through said controller means whether a write command has been received from said computer;

determining through said controller means whether said predetermined storage of said optical disk encased by said selected optical disk cartridge is exceeded;

retrieving from said first data storage means said next available unique preformatted disk ID; and, controlling said computer display through said controller means to provide a prompt to load said optical disk cartridge having said next available unique preformatted disk ID into said optical disk cartridge storage and retrieval device, said prompt including said next available unique preformatted disk ID.

16. The storage and retrieval method according to claim 15, further comprising the steps of:

loading said optical disk cartridge having said next available unique disk ID into said optical disk cartridge storage and retrieval device;

writing through write means said media ID together with said next available unique preformatted disk ID to said first data storage means.

17. A system for the storage and retrieval of off-line optical media, said system comprising:

optical disk cartridge storage and retrieval means, said optical disk cartridge storage and retrieval means including:

data storage means for storing a list of preformatted disk ID's and media ID's, wherein each of said preformatted disk ID's is unique to one of a plurality of optical disk cartridges, wherein each of said media ID's is associated with at least one of said plurality of optical disk cartridges and corresponds to at least one of said unique preformatted disk ID's, and wherein said optical disk cartridges are stored in said cartridge storage and retrieval device or off-line;

means for storing a preselected number of said optical disk cartridges;

controller means for determining whether a selected one of said optical disk cartridges is stored in said optical disk cartridge storage and retrieval means; and, a computer including a display, said computer being connected to said optical disk cartridge storage and retrieval means for accessing information stored in any of said plurality of optical disks encased by said optical disk cartridges, wherein said computer sends an inquiry to access said information according to a desired one of said media ID's, and wherein when said selected optical disk cartridge associated with said desired media ID is not stored within said optical disk storage and retrieval means, said controller means controls said display to provide a message to load said selected optical disk cartridge according to said unique preformatted disk ID associated with said at selected optical disk cartridge.

18. The storage and retrieval method of claim 17, wherein said computer means comprises at least one workstation, wherein said at least one workstation is connected to said optical disk storage and retrieval device via a computer network.

19. The method of claim 17, wherein said optical disks are selected from the group comprising: magnetic, optical or magneto-optical disks.

20. A method for the storage and retrieval of off-line optical disk media, comprising the steps of:

affixing a label on each of a plurality of optical disk cartridges, each of said labels having a first index and a second index adjacent thereto, wherein said first index comprises an alphanumeric code selected from a sequential series of alphanumeric codes, said alphanumeric code being uniquely associated with one of said plurality of optical disk cartridges and comprising a preselected number of color-coded characters, and wherein said second index comprises an optical code capable of being read with an optical code scanning device to generate electrical signals representing said unique alphanumeric code;

preformatting optical disks encased by said plurality of optical disk cartridges with a unique preformatted disk ID, said unique preformatted disk ID comprising said unique alphanumeric code of said optical disk cartridge;

storing into data storage in an optical disk cartridge storage and retrieval device, a list of said unique preformatted disk ID's, wherein each of said optical disk cartridges is located in said optical disk cartridge storage and retrieval device or off-line;

sending an inquiry from a computer connected to said optical disk cartridge storage and retrieval device, said inquiry comprising a request to access a selected one of a said plurality of optical disk cartridges, wherein said request to access said selected optical disk cartridge is by a media ID associated with said selected optical disk cartridge;

addressing said data storage through said computer according to said media ID, wherein said media ID corresponds to at least one of said unique preformatted disk ID's;

determining through a controller whether said selected optical disk cartridge is located in said optical disk cartridge storage and retrieval device; and, controlling said computer display through said controller to provide a prompt to load said selected optical disk cartridge into said optical disk cartridge storage and retrieval device when said selected optical disk cartridge is not stored in said optical disk cartridge storage and retrieval device, said prompt including said unique preformatted disk ID corresponding to said selected optical disk encased by said optical disk cartridge.

21. A system for the storage and retrieval of off-line optical media, said system comprising:

a jukebox device, said jukebox device including:

a data storage for storing a list of preformatted disk ID's and media ID's, wherein each of said preformatted disk ID's is unique to one of a plurality of optical disk cartridges, wherein each of said media ID's is associated with at least one of said plurality of optical disk cartridges and corresponds to at least one of said unique preformatted disk ID's, and wherein said optical disk cartridges are stored in said jukebox or are off-line;

a storage unit for storing a preselected number of said optical disk cartridges;

a controller for determining whether a selected one of said optical disk cartridges is stored in said jukebox device; and, a computer including a display, said computer being connected to said jukebox device for accessing information stored in any of said plurality of optical disks encased by said optical disk cartridges, wherein said computer sends an inquiry to access said information according to a desired one of said media ID's, and wherein when said selected optical disk cartridge associated with said desired media ID is not stored within said optical disk storage and retrieval means, said controller controls said display to provide a message to load said selected optical disk cartridge according to said unique preformatted disk ID associated with said at selected optical disk cartridge.

* * * * *